United States Patent [19]
Platt et al.

[11] Patent Number: 5,835,764
[45] Date of Patent: Nov. 10, 1998

[54] TRANSACTION PROCESSING SYSTEM AND METHOD HAVING A TRANSACTIONAL SUBSYSTEM INTEGRATED WITHIN A REDUCED KERNEL OPERATING SYSTEM

[75] Inventors: Michael Platt; Andrew James Stanford-Clark, both of Hampshire, United Kingdom

[73] Assignee: International Business Machines Corporation, Armonk, N.Y.

[21] Appl. No.: 655,527

[22] Filed: May 30, 1996

[30] Foreign Application Priority Data

Jun. 30, 1995 [GB] United Kingdom .................. 9513402

[51] Int. Cl.⁶ ...................................... G06F 9/00
[52] U.S. Cl. ........................................ 395/671; 395/680
[58] Field of Search ................... 395/671, 674, 395/670, 680; 364/222.8

[56] References Cited

U.S. PATENT DOCUMENTS

| | | | |
|---|---|---|---|
| 4,823,304 | 4/1989 | Frantz et al. | 395/200.62 |
| 5,193,188 | 3/1993 | Frandszek et al. | 707/8 |
| 5,586,312 | 12/1996 | Johnson et al. | 707/10 |

OTHER PUBLICATIONS

"Camelot: A Flexible, Distributed Transaction Processing System", Alfred Z-Spector et al., Comp. Scie. Dept., Cornegie Mellon Univ., 1988 IEEE.

*Primary Examiner*—Majid A. Banankhan
*Attorney, Agent, or Firm*—Jeanine S. Ray-Yarletts

[57] ABSTRACT

According to the present invention, a transaction processing system is provided for executing transactional processes representing transactions, wherein the transaction processing functionality is integrated within a reduced kernel operating system such as a microkernel or nanokernel operating system. The system of the invention comprises a processor for executing the processes, and a main memory accessible to the processor for storing programs, including a reduced kernel operating system, to be executed by the processor. The main memory of the system has a supervisor area (510) where operating system functions forming the reduced kernel are stored, and a user area (520) where user programs and other operating system functions are stored. According to the present invention, a data structure (565, 570) is stored in the supervisor area (510) of main memory for storing information about the processes to be executed by the processor, and additionally the following operating system functions are stored in the supervisor area (510) of main memory:

- a scheduler (560) for applying a scheduling policy to determine the order in which processes identified in the table are provided to the processor for execution;
- a concurrency control manager (550) for managing the transactional processes to be executed by the system; and
- a message passing system (540) for passing messages between processes being executed by the processor, and for notifying the concurrency control manager (550) of any messages received by the message passing system from the transactional processes.

13 Claims, 5 Drawing Sheets

TRANSACTION PROCESSING SYSTEM AND METHOD HAVING A TRANSACTIONAL SUBSYSTEM INTEGRATED WITHIN A REDUCED KERNEL OPERATING SYSTEM

FIELD OF THE INVENTION

The present invention relates to the field of data processing, and more specifically to a transaction processing system, and to a method of implementing such a system.

BACKGROUND ART

Today, enterprises of all sizes, from small retailers to giant banks, use transaction processing to control and manage the vital function of their businesses. In the context of transaction processing, an application can be considered to be a particular business function implemented by data processing, for example, a payroll application or an order entry application. Commercial applications typically process many similar items, for example, orders in an order processing system, seat reservations in an airline booking system, or credit queries in a credit control system. The processing of one of these items is a business transaction. Hence a transaction can be defined as a discrete unit of processing that corresponds to a business transaction and constitutes a logical entity within an application.

In a transaction processing system, one execution of an application program processes a single transaction. End users have on-line access to the system and to enterprise data, and directly initiate transactions. In a transaction processing environment, many users repeatedly process similar transactions, and require a fast response to each transaction. Examples of such users are order entry clerks, airline reservation clerks, or bank tellers. They share an environment of programs and data. Hence, it can be seen that a transaction processing system must manage discrete units of work that access and update shared data, and it must do so with speed, efficiency, integrity, and at reasonable cost. It should be noted that a unit of work can comprise many computer tasks, including user interface, data retrieval, and communications.

In a transaction processing system, more than one transaction may read or cause changes to a single data file. It is important that transactions read valid data and that their updates are correctly recorded in order to preserve data integrity. To preserve data integrity, each transaction must have four key characteristics, Atomicity, Consistency, Isolation and Durability, known collectively by their initial letters as ACID.

Atomicity means that a transaction must be accomplished as a whole or not at all. If a transaction cannot be completed in its entirety, all its effects must be undone. This requires a backout or backward recovery facility in the transaction processing system.

Consistency means ensuring that the results of a transaction are reproducible and predictable. The transaction must always give the same results in the same conditions. This is achieved by program and code design, using such techniques as reusability and reentrancy to ensure that the same code is executed at each invocation of a transaction. An example of where particular care must be taken to ensure consistency is where two records are to be updated. Updating of a first record, followed by updating of a second record should have the same effect as updating of the second record, followed by updating of the first record, that is the order of the updates should not affect the end results achieved by the updates.

Isolation means that no transaction must interfere with any concurrently executing transaction. This is achieved by concurrency control. Several concurrently running transactions can update different records in the same data set. An efficient means of sharing the dataset needs to be provided in order to allow this concurrent updating to occur. The same record must not be updated by two transactions at the same time, that is a transaction must complete an update on a record before any other transaction is allowed to start an update on that record. The use of locking as a method of sharing achieves concurrency control. A lock is a mechanism by which use of a resource is restricted to the holder of the lock. A transaction requests the lock for a data set or for a record of that data set from the resource manager of that data set. The mechanism by which the lock is implemented may be a flag associated with the data set or a flag associated with each record in the data set. Once a transaction receives that lock then no other transaction may update the data set or the record for which the lock was received.

Durability means that the results of a transaction must be permanent. Durability is achieved by a forward recovery process. When a transaction has been committed (that is, it is to be made permanent or irreversible), then an image of the records changed by the transaction (an after image) is taken. If a data set failure occurs at a time after the transaction has been committed, such that a backup copy of the data set has to be used to replace the lost data set, then the after image of the records which were updated can be used to reinstate the updates made by the transaction.

Committing a change means making it permanent or irreversible. A single transaction can update more than one data set managed by one or more resource managers. These updates are usually logically related and data integrity is lost if one update succeeds whilst another fails. If data integrity is to be maintained, then the resource managers must be capable of either performing (committing) all the updates together when the transaction signals successful completion or of backing out all of the updates if the transaction fails. This requires commitment control, which must include a means of backing out all of the updates made by a transaction, such as by a backward recovery facility.

Commitment procedures may be single phase commit or two phase commit (2PC). If only a single resource manager is involved in the commit process, only a single operation is necessary to commit all of the changes associated with a transaction.

If two or more resource managers are involved in a single transaction, then a commit process having two phases would generally be used (two phase commit or 2PC). In the first phase, each resource manager is asked to prepare to commit.

In the second phase, if all the resource managers have signalled that they are prepared to commit, then each resource manager is asked to commit, otherwise each resource manager is asked to backout. The last resource manager then commits the transaction and sends a committed message back along the chain to the first resource manager.

In the simplest implementation of a two phase commit protocol, the decision to commit or to backout updates is taken when a transaction completes successfully or when it fails. It is helpful to application design if updates are arranged so that there is consistency of data at other logical points during the execution of the transaction. All such points of data consistency (including transaction termination) are called commit points or sync points.

A sync point is taken at the end of every transaction. Whenever a sync point is taken, the system goes through a commit protocol to ensure consistency of data. An application can explicitly request a sync point to be taken at any point in a transaction. An interrupted transaction can be restarted from its last sync point.

The processing between sync points is called a "logical unit of work" (LUW). If any of the data changes in a LUW are not successfully completed, then all of them are reversed (backed out). To support the concept of LUWs, the system should maintain sufficient information to enable the backing out of all changes in the LUW if any change cannot be committed. A failure to commit can be caused by an application error, a system failure, or a network failure. When changes are committed, as a result of successful completion of the two phase commit protocol performed during a sync point, they are not backed out after a subsequent failure of the transaction or of the system. Any locks held by the transaction are released by the transaction at the end of a LUW since the data with which the lock has been associated is now in a consistent state. Typically, transaction processing systems include a 'transaction manager' which provides unit-of-work management, that is, the function needed to perform transaction begin, end, commit, and rollback.

A conventional transaction processing system typically has three main elements: one or more resource managers for managing sets of data records to ensure that data integrity is maintained, a presentation system for enabling interaction between users and the transaction processing system, and a concurrency control manager (or CCM) for controlling the state of the Transaction system. The CCM is typically provided by a Transaction Manager.

The CCM supports the serialisability of processing to provide the Isolation property of transactions, this being one of the required ACID properties mentioned earlier. By virtue of the Isolation property, transactions can execute in parallel in complete isolation if the data records that each transaction accesses are disjoint with those being accessed by every other transaction. There are a number of concurrency control protocols that have been proposed to ensure that concurrency control is achieved, the locking technique mentioned earlier being one such protocol, but others including timestamp ordering, optimistic, and serialisation graph testing; these techniques are discussed in a number of texts, see for example page 406–420 of the book "Concurrent Systems" by Jean Bacon, published by Addison-Wesley. In addition there are a number of refinements which can be made within each of the protocols. The locking protocol is the most widely adopted and shows the best performance characteristics. The CCM maps the concurrency control protocol to the actual system and so is the heart of the transactional system.

The Concurrency Control Protocol has associated with it a scheduling methodology and mapping to the standard process table of the operating system; the process table of an operating system will be discussed in more detail later with reference to FIG. 3. A transaction processing system relies on the services of the underlying operating system and its subsystems in order to carry out functions such as:

- Access to the communication network
- Loading application programs
- Managing main storage
- Input/output operations
- An efficient scratchpad facility
- Recording monitoring and accounting data
- Security
- Directory services
- Systems management The CCM functionality described above can be located in one of two places within the Transactional system. It can be either part of the base operating system where the transaction processing functionality is integrated as part of the operating system, or it can be added as a set of libraries above the base operating system. These two types of transaction processing system are discussed in more detail below.

FIG. 1 shows an integrated transaction processing environment, where the Transaction Manager, and hence the CCM, is integrated as part the base operating system. In this environment, transaction management is an integral part of the base operating system, as are other major functions such as database and file management, communication services, and other operating system services. Although this environment usually includes databases and file services, it may need access to external resource managers, in which case it needs an external Resource Manager (RM) interface.

FIG. 2 shows a sample modular transaction processing environment, where the Transaction Manager sits above the base operating system. A modular environment consists of a number of separate components that work together by communication across defined interfaces. In the example shown, communication services, the transaction manager, and the resource managers are completely separate and have their own APIs. The transaction monitor shown in FIG. 2 is an optional component that adds value by providing services that make transaction processing easier and more efficient. However, for the purposes of the present invention, the transaction monitor need not be described in any further detail, it being sufficient to state that, in this environment, transaction processing is possible without the use of a transaction monitor because an application can directly access the transaction manager and other services.

For unit-of-work management, the transaction manager interfaces with the local resource managers using a defined protocol, for example the standard XA Interface. When the unit of work is distributed (that is, it accesses remote resources), the transaction manager interfaces with the communications services component.

There are a number of disadvantages associated with the two types of transaction processing system described above. The integrated approach enables the transactional system to be viewed as a single system by any transaction processing applications running on the system, this single system having control for security, management and administration. However, since the transaction processing system is within the operating system, each transaction processing application must separately communicate directly with the operating system during the performance of transactions, each such communication resulting in a cross operating system boundary call. Hence a large number of cross operating system boundary calls will generally occur during a typical transaction, and this involves considerable process scheduling overhead. One activity which contributes to the delay is that of context switching, this being the switching of the processor from one process to another. Each time a context switch takes place, a certain amount of time is taken up with administration, for example saving and loading registers and memory maps, updating various tables and lists, etc. This extra processing activity has the result that such integrated transaction processing systems generally exhibit slow performance, this being a significant disadvantage in most situations where transaction processing systems are employed.

An example of an integrated transactional system is Tandem's Guardian system which has an integrated log and transaction manager (TMF), a transactional message passing Remote Procedure Call (RPC) and uses a generic lock manager to undertake database locking. Other examples are IBM's MVS/APPC which has an integrated transaction manager, a log manager and an integrated lock manager (IRLM), and DEC's VMS, which also has a transaction manager as a standard part of the operating system (DECdtm) with VMS providing the generic lock facility. There are as yet no UNIX based integrated transactional systems. These prior art systems are inherently slower than the alternative approach of retaining the transaction manager above the operating system, since the arrangement of these systems causes a large number of cross operating system boundary calls to occur during a typical transaction which involves considerable process scheduling overhead. The instantiation of a full-blown process to support a single transaction in such an environment can be an extremely cumbersome and time-consuming activity.

The alternative approach, where the Transaction Manager resides above the operating system, maintains all the transactional process threads as part of the above operating system transactional region. As a result, the operating system only ever communicates with the transaction processing system rather than with the individual transaction processing applications. This overcomes the process and context switch problems of the integrated approach, but has the disadvantage that the operating system mechanisms for security, management and administration are no longer able to function at the level of the individual transaction processing applications.

A number of systems are available today which employ this alternative approach of placing the entire transactional system above the operating system level. There are several UNIX-based transactional systems such as Novell's Tuxedo, Transarc's Encina, and IBM's CICS for AIX which provide the transaction functionality by adding transaction calls as libraries above the base UNIX operating system. While these systems offer good performance, they cannot rely on the operating system to manage inter-transactional security and debugging.

Hence it can be seen that, in the current world of transaction processing, two types of systems are available, each having complementary advantages and drawbacks.

The problems with context switch overhead of operating system calls are well understood in the operating system world and recently a new approach to operating system design which reduces context switch overhead and at the same time provides object oriented and modular operating systems has been proposed. While operating systems such as UNIX have for some time embodied the idea of a kernel containing the main functions of the operating system, this new type of operating system is characterised by having a reduced kernel with a minimal amount of functionality being placed within the kernel. All the other functions of the operating system are then placed in what is termed the 'user space' of processor memory; the terms 'User space' and a related term 'Supervisor space' will be discussed in more detail later with reference to FIG. 3. Dependent on the extent to which the kernel has been reduced, these type of operating systems are variously referred to as microkernel, nanokernel, or minimalist kernel operating systems; we will refer to all such operating systems as reduced kernel operating systems hereafter. As will be discussed in more detail in the description of the preferred embodiment of the present invention, in reduced kernel operating systems, a very simple message passing system and a scheduler are the major components of the operating system to be instantiated in the supervisory space of the processor's memory. These reduced kernel-based operating systems are now reasonably well understood and beginning to enter the mainstream of operating system design. It has been shown that reduced kernel-based operating systems can provide full operating system functionality with similar performance characteristics to that of conventional fully integrated kernels.

The only transactional processing system which currently employs a reduced kernel based operating system is a research system called 'Camelot' developed at Carnegie Mellon University in the USA. This is a user-space transactional system which resides above a UNIX operating system which itself has a reduced kernel. Although a reduced kernel is present in this system, there are no transactional semantics to be found within the operating system. The Camelot system is hence similar to any other system where the transactional system is placed above the operating system, and suffers from the same drawbacks that all such systems have, ie those relating to security, management and administration.

DISCLOSURE OF THE INVENTION

According to the present invention there is provided a transaction processing system for executing transactional processes representing transactions, the system comprising: a processor for executing the processes; a main memory accessible to the processor for storing programs, including a reduced kernel operating system, to be executed by the processor, said main memory having a supervisor area where operating system functions forming the reduced kernel are stored, and a user area where user programs and other operating system functions are stored, a data structure being stored in the supervisor area of main memory for storing information about the processes to be executed by the processor, and the following operating system functions being stored in the supervisor area of main memory: a scheduler for applying a scheduling policy to determine the order in which processes identified in the table are provided to the processor for execution; a concurrency control manager for managing the transactional processes to be executed by the system; and a message passing system for passing messages between processes being executed by the processor, and for notifying the concurrency control manager of any messages received by the message passing system from the transactional processes.

Viewed from a second aspect, the present invention provides a method of implementing a transaction processing system to execute transactional processes representing transactions, the system having a processor for executing the processes, and a main memory accessible to the processor for storing programs, including a reduced kernel operating system, to be executed by the processor, the method comprising the steps of: establishing within said main memory a supervisor area where operating system functions forming the reduced kernel are stored, and a user area where user programs and other operating system functions are stored; storing a data structure in the supervisor area of main memory for storing information about the processes to be executed by the processor; storing the following operating system functions in the supervisor area of main memory: a scheduler for applying a scheduling policy to determine the order in which processes identified in the table are provided to the processor for execution; a concurrency control manager for managing the transactional processes to be executed by the system; and a message passing system for passing messages between processes being executed by the processor, and for notifying the concurrency control manager of any messages received by the message passing system from the transactional processes.

Viewed from a third aspect, the present invention provides a program product incorporating a reduced kernel operating system for use with a transaction processing system to execute transactional processes representing transactions, the transaction processing system having a processor for executing the processes, and a main memory accessible to the processor for storing programs, including the reduced kernel operating system, to be executed by the processor, said main memory having a supervisor area where operating system functions forming the reduced kernel are stored, and a user area where user programs and other operating system functions are stored, the program product being arranged to provide a data structure for storing information about the processes to be executed by the processor, and the following operating system functions, for storage in the supervisor area of main memory when loaded on to the transaction processing system: a scheduler for applying a scheduling policy to determine the order in which processes identified in the table are provided to the processor for execution; a concurrency control manager for managing the transactional processes to be executed by the system; and a message passing system for passing messages between processes being executed by the processor, and for notifying the concurrency control manager of any such messages received by the message passing system from the transactional processes.

The present invention uses the integrated approach described earlier in a reduced kernel based operating system, the transactional subsystem being integrated as a part of the base operating system below the operating system interface and appearing as added transaction functionality to the standard set of base operating system calls. It has been found that a transactional system in accordance with the present invention allows full operating system functionality whilst at the same time providing high performance transaction processing. In other words, the transactional processing system according to the present invention exhibits the advantages of both types of prior art system, without the drawbacks of either.

In preferred embodiments of the present invention, a resource manager function is stored in the user space of the main memory for managing data records to be manipulated by the transactional processes.

Additionally, the data structure preferably consists of two tables, the first table being a process table holding information about all processes currently active in the system, there being one entry in the table for each currently active process, and the process table including a field in which a transaction identifier can be stored in any entry for a transactional process, the second table being a transactional table having an entry for each transaction identifier to store information about the status of the transaction. In such an arrangement, the concurrency control manager can be arranged to allocate a transaction identifier to each new transaction when it is notified by the message passing system of a message requesting a new transactional process to be created.

In preferred embodiments, the Concurrency Control Manager periodically instructs a resource manager process to store a copy of the data structure in a storage device associated with that resource manager process. This approach ensures that data integrity is maintained in the transaction processing system, by allowing the ACID characteristics of transactions to be maintained.

Further in preferred embodiments, the Concurrency Control Manager is responsive to messages sent between transactional processes and resource manager processes to instruct the scheduler to update the entries for those transactional processes in the data structure to indicate whether those transactional processes are ready to run or not. In this manner, transactional processes will not be allocated processor time by the scheduler during the interval between requesting data records from a resource manager and actually receiving those data records. This enables efficient use of the processor to be achieved.

According to the transaction processing system of the present invention, transactional semantics are supported at the very lowest level of the operating system. This architecture supports the transactional model with a very simple reduced kernel type transactional kernel which has concurrency control integrated as part of the base transactional kernel. In addition the transactional verbs (such as BEGIN_WORK and COMMIT) are supported by this transactional kernel, and a modified message passing system provides intra transactional support by interacting with the resource manager.

BRIEF DESCRIPTION OF THE FIGURES

The present invention will be described further, by way of example only, with reference to a preferred embodiment thereof as illustrated in the accompanying drawings, in which.

DESCRIPTION OF PREFERRED EMBODIMENT

Before discussing the preferred embodiment in detail, a reduced kernel operating system will be discussed in more detail with reference to FIGS. 3 and 4. Conventional operating systems have become large and unwieldy. As these operating systems grew in size, a great deal of research effort was devoted to considering how best they should be structured. One proposal advocated an 'open' operating system structure, the idea here being that those functions which are needed universally, by every component of a system, form a 'minimal kernel', sometimes referred to as a microkernel, or a reduced kernel as we shall refer to it herein. Other functions, such as the file storage service and much of the memory management and communications handling can then be provided above the kernel and run as user level processes. The aim in reduced kernel operating system design is to implement efficient basic mechanisms in the kernel and as much as is reasonable at user level.

Figure 1:
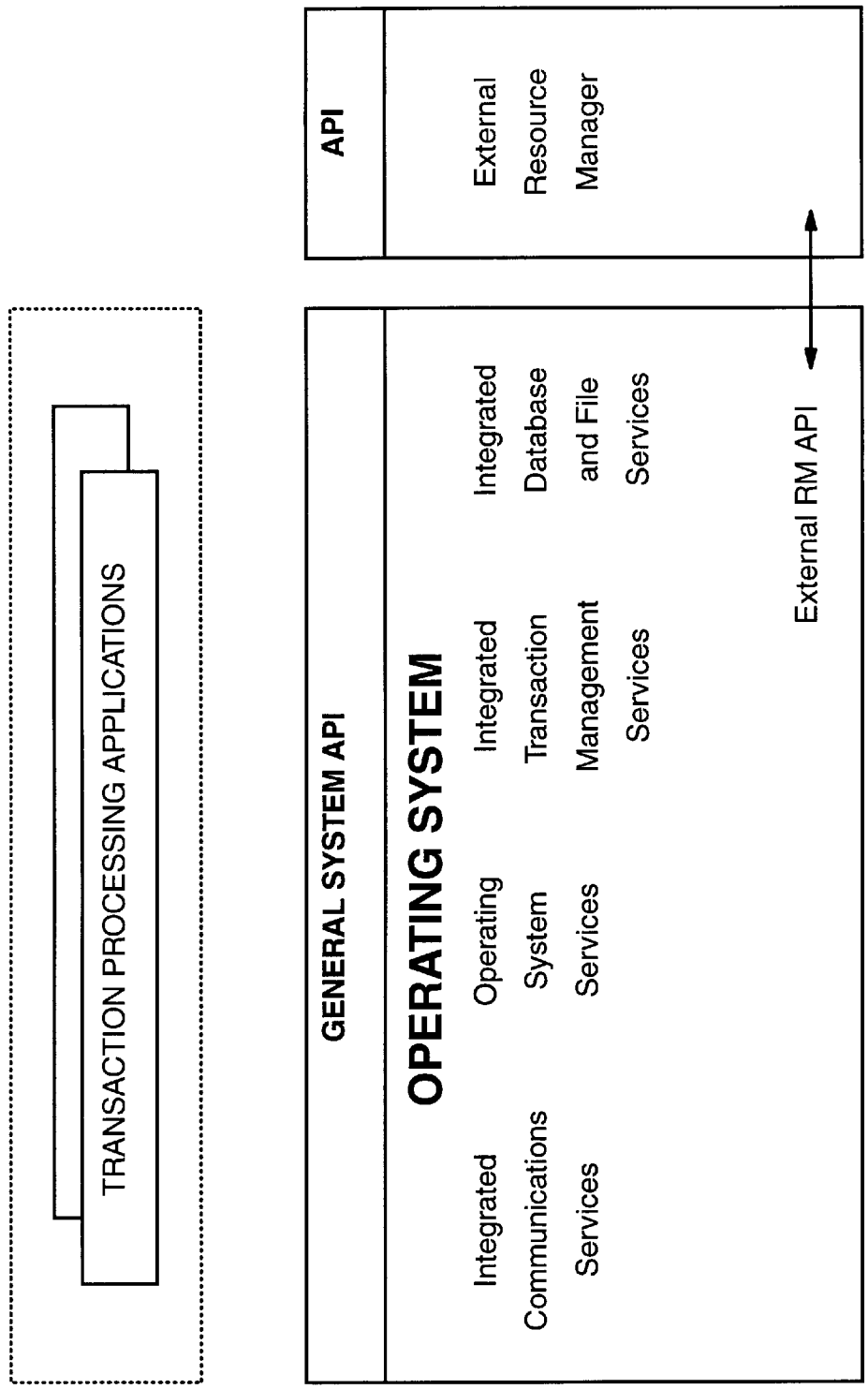
FIG. 1 illustrates the structure of a prior art transaction processing system wherein the transaction management is an integral part of the base operating system.
Figure 2:
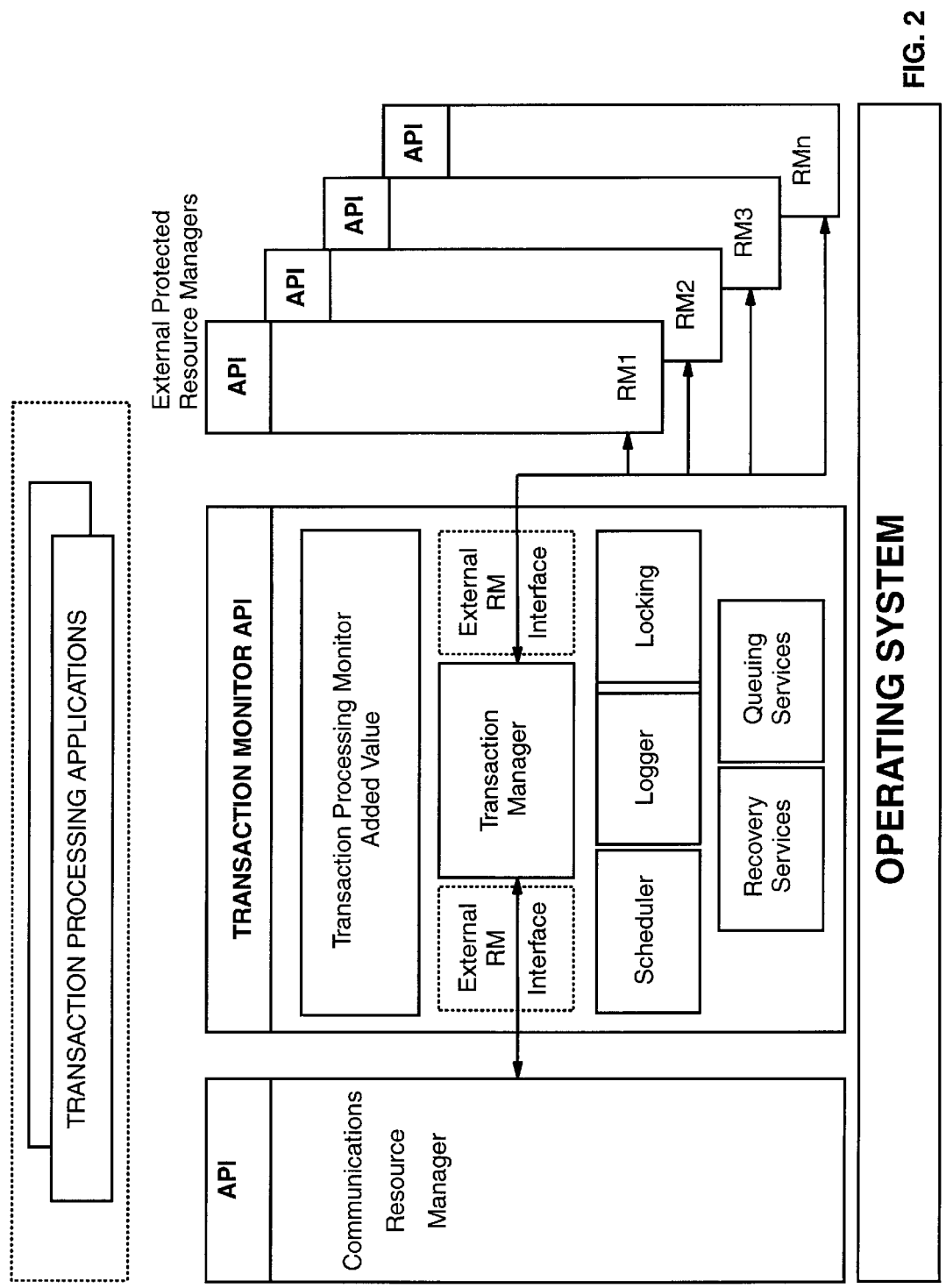
FIG. 2 illustrates the structure of a prior art transaction processing system where the Transaction Manager resides above the base operating system.
Figure 3:
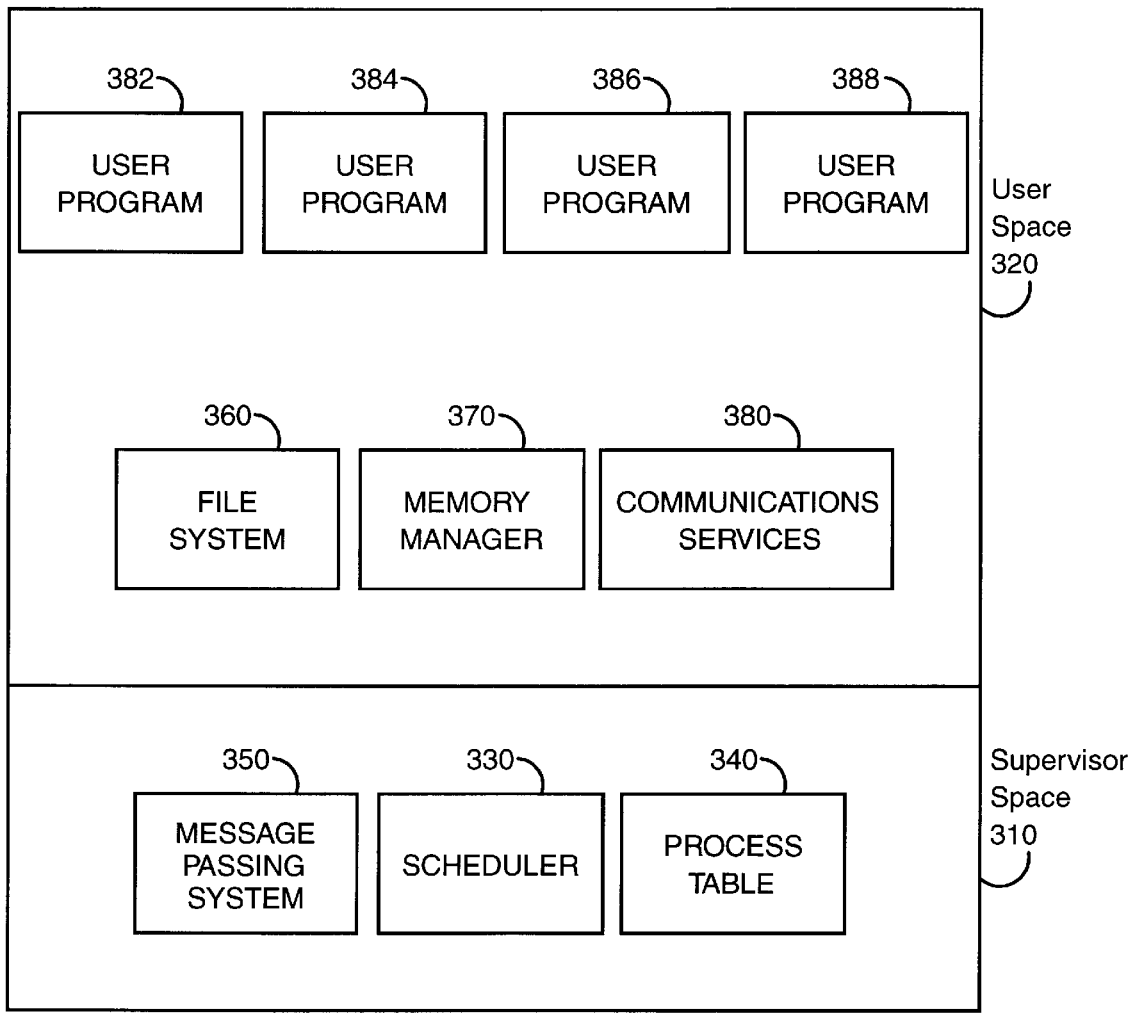
FIG. 3 is a diagram illustrating the structure of a reduced kernel operating system.

FIG. 3 illustrates the structure of a reduced kernel operating system. The functions provided by the reduced kernel are stored in an area 310 of the main memory available to the system processor, this area being referred to hereafter as 'Supervisor space'. All of the other functions of the operating system are stored outside of this privileged area of memory, in an area 320 which hereafter shall be referred to as 'User space'. The terms 'user space' and 'supervisor space' will be familiar to those skilled in that art, as will their relevance to the operating mode of the processor. When executing processes stored in the Supervisor space, the processor is arranged to run in a privileged 'supervisory' mode, where, for example, it is able to access hardware I/O devices and all areas of main memory. In contrast, the processor will not have such broad access rights when executing processes stored in the User space, the processor then running in a protected 'user' mode.

FIG. 3 does not include every function that will be placed in the supervisor space 310 and the user space 320 when implementing a reduced kernel operating system. Indeed, as will be appreciated by those skilled in the art, the decision as to exactly which operating system functions should be placed within the reduced kernel will depend to a certain extent on exactly what functions the computer system on which the operating system is installed is intended to provide. However FIG. 3 is intended to illustrate the general idea of such reduced kernel operating systems, namely that of providing a minimal functionality within the kernel, thereby leading to low overhead and the potential for high performance.

With reference to FIG. 3, typical operating system functions such as the file system 360, memory manager 370, and communication services 380 are provided in the user space 320 of main memory. Also provided in this users space 320 are various user programs 382, 384, 386, 388 available to the user of the system.

Within the supervisor space 340, a message passing system 350, a scheduler 330 and a process table 340 are provided. The purpose of the process table and scheduler will now briefly be discussed. A key concept in all operating systems is 'the process'. A process is basically a program in execution. It consists of the executable program and all the information needed to run the program. Periodically the operating system will decide to stop running one process and start running another, for example because the first one has had more than its share of CPU time in the past second. When a process is temporarily suspended like this, it must later be restarted in exactly the same state it had when it was stopped. This means that all information about the process must be explicitly saved somewhere during the suspension. Typically, operating systems identify this information in an operating system table called the process table, this being an array or linked list of structures, one structure or entry being included for each process currently in existence. An entry for a particular process will include information about the process' state, its program counter, stack pointer, memory allocation, the status of its open files, its accounting and scheduling information, and everything else about the process that must be saved when the process is suspended, so that it can be restarted later as if it had never been stopped.

From the information stored in the process table, the operating system should be able to choose and run the highest priority process as quickly as possible. Selecting a process to run on the processor is called 'process scheduling', and the scheduler 330 performs this function based on the information in the process table. The scheduler 330 employs a scheduling policy to determine which process is selected from the process table, there being a number of scheduling policies known in the prior art.

From the above discussion, it is apparent that all the runnable software on the computer, including the operating system, is organized into a number of processes, and the processor switches between these processes under the control of the scheduler and the process table. During the running of a process, other processes may need to be created to implement particular functions. Further, when a user process has completed it generally will need to be destroyed. Operating systems typically provide system calls to enable processes to be created and destroyed.

When a process is running, it will often need to communicate with other processes. For instance, when a user process wants to read from a file, it must tell the file process what it wants. Then the file process needs to tell the disk process to read the required block from the file. In reduced kernel operating systems, this interprocess communication occurs via message passing, and a message passing system 350 is provided to handle these messages.

Figure 4:
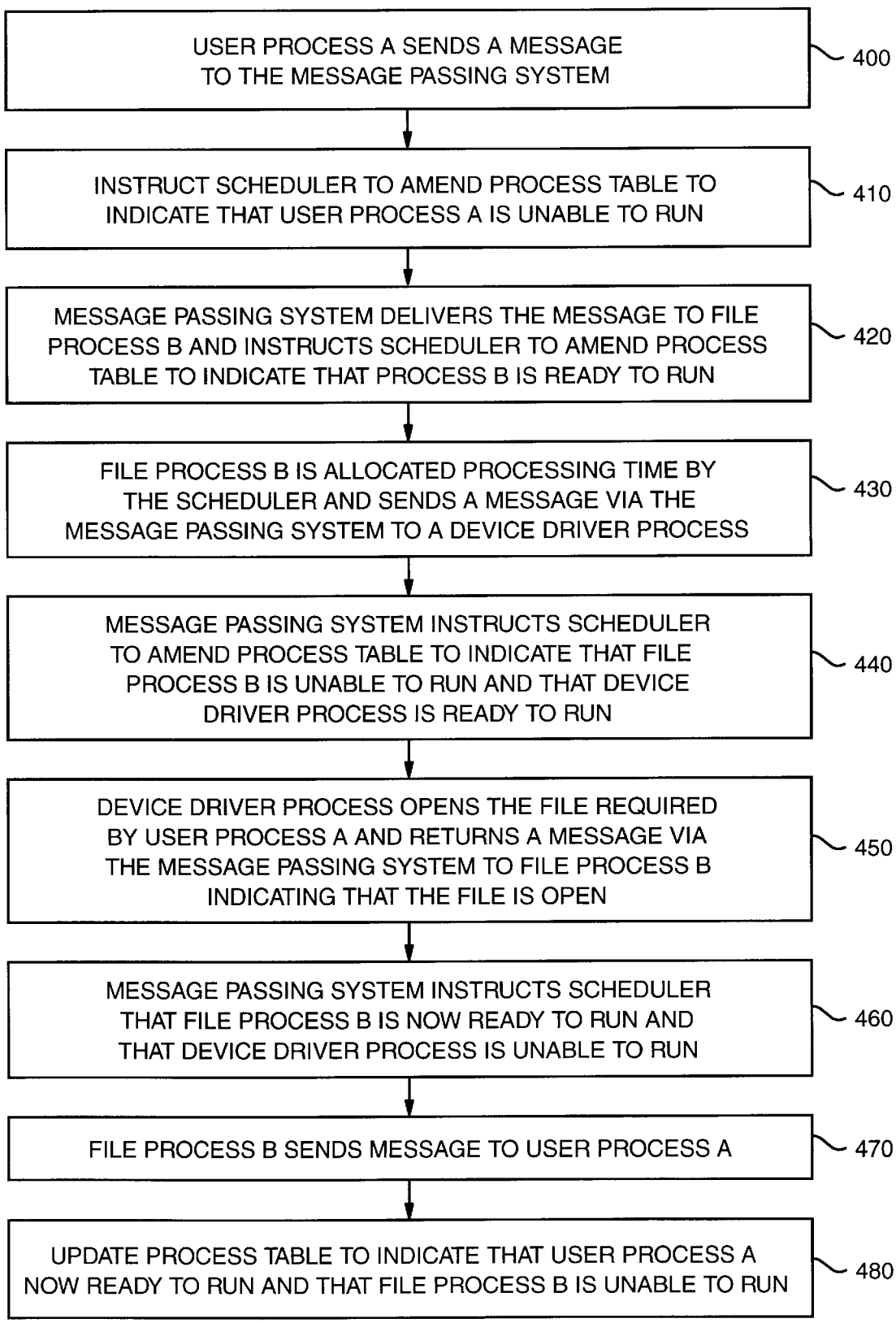
FIG. 4 is a flow diagram illustrating how the message passing system of a standard reduced kernel operating system operates.

FIG. 4 is a flow diagram illustrating, with reference to a specific example, how the message passing system 350 operates. We will consider an example where the user indicates that user program 382 should be executed. A system call is made from the currently executing process to create a user process A to execute user program 382, and an entry is then made by the scheduler 330 in the process table 340 to store the necessary information about Process A.

According to the scheduling policy being used, this process A will at some point be selected by the scheduler 330 for execution by the processor. If, during this period of execution, the process A needs to open a file, it will send a message giving details of the file to be opened to the message passing system 350 (step 400). Assuming that process A needs this file to be opened before it can proceed any further, then process A will be blocked, ie. unable to run, until the file has been opened. This being the case, then at step 410, the message passing system will tell the scheduler to alter the process table entry for process A to store the current state of process A and to indicate that Process A is unable to run. By doing this, the scheduler will no longer give Process A processor time until its entry is returned to a ready to run status.

As a result of receiving the message, the message passing system also delivers the message to a file process B providing the File System function of the operating system (step 420). Additionally the message passing system tells the scheduler 330 to amend the process table entry for Process B to indicate that process B is ready to run. This will generally be necessary since, between tasks, processes such as the file process B remain dormant awaiting a message to be sent to them. While they are in this dormant state, it is clearly unnecessary for the scheduler to allocate processor time to them, and the entry for such processes will hence be set to an 'unable to run' status when the process is not being used.

The message passing activity now complete, the scheduler 330 is called to allocate a new process to the processor. When scheduler 330 selects file process B for execution, process B will act upon the message sent to it by sending a message, at step 430, via the message passing system 350 to a device driver process for a specific storage device upon which the file can be opened, requesting that that file be opened. At this point, user process B will be stalled awaiting a response from the device driver process. Hence, as with user process A, the message passing system instructs the scheduler at step 440 to alter the entry in the process table for process B to indicate that process B is unable to run, and to update the entry for the device driver process to indicate that it is ready to run.

When the device driver process is allocated processor time by the scheduler at step 450, it opens the file in the storage device and returns a message to the file process B via the message passing system indicating that the file has been opened. The message passing system will send this message on to process B, whilst also telling the scheduler at step 460 to amend the process table to indicate that Process B is now ready to run, and that the device driver process is not ready to run.

In a similar fashion, Process B is subsequently executed on the processor at step 470 to send a message via the message passing system to user process A. User process A is now ready to run, since the reason for it being blocked no longer exists. Hence, at step 480, the process table entry for user process A is amended to indicate that it is ready to run, and user process A can then be executed again whenever the scheduler 330 selects it for execution.

For a more detailed discussion of reduced kernel operating systems, reference can be made to any of a number of books and articles published about these systems. For instance, Andrew Tanenbaum's book "Operating Systems, Design and Implementation" published by Prentice-Hall International, Inc provides a detailed discussion of reduced kernel operating systems with particular reference to the MINIX operating system. Additionally, a general discussion of reduced kernel operating systems can be found in Chapter 22 of the book "Concurrent Systems" by Jean Bacon, published by Addison-Wesley.

Having discussed the general properties of a reduced kernel operating system, the transactional processing system of the preferred embodiment will now be described with reference to FIG. 5.

The transaction processing system of the preferred embodiment uses the reduced kernel operating system approach, and supports transactional messages within the reduced kernel. This reduced kernel will be referred to hereafter as a transactional microkernel (or T$\mu$K). All of the conventional operating system and transaction management functions are exported to user space above the processor's supervisory space. According to this preferred embodiment, functions such as the conventional operating system file system, a transactional file system or a database become resource managers for the transactional microkernel. In effect, any user process can be thought of as a resource manager and, providing it is state safe, is indistinguishable from a conventional resource manager. The support of the resource manager, file system, etc above the supervisory space allows the transactional microkernel to be readily adapted to support these types of facilities provided by a number of different companies, merely by including the appropriate resource manager processes, file system processes, etc in user space.

Figure 5:
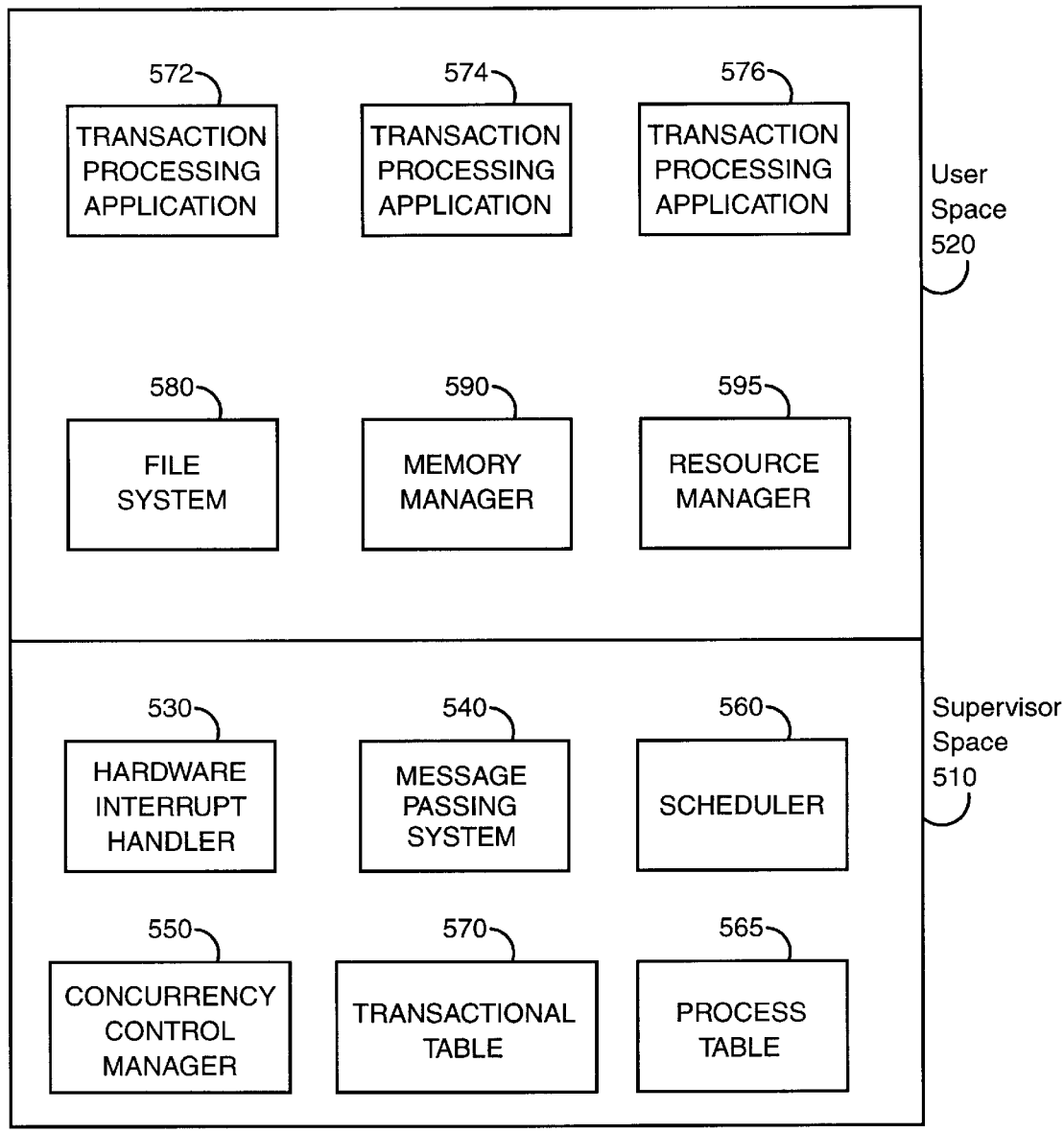
FIG. 5 is a diagram illustrating the structure of a transaction processing system according to the preferred embodiment of the present invention.

FIG. 5 is a diagram illustrating the structure of the transactional microkernel used in the preferred embodiment of the present invention. There are four main functions provided within the supervisor space 510 of the transactional microkernel. These are the Hardware Interrupt Handler 530, the transactional message passing system 540, the transactional concurrency control manager 550, and the scheduler 560.

The Interrupt Handler 530 receives incoming messages from hardware such as disks or network connections, and passes them to the transactional message passing system 540. For each such message received, the message passing system then communicates with the scheduler 560 to update the process table 565 to unblock any processes that were blocked whilst waiting for that message from the hardware (ie by changing the status of those processes from 'unable to run' to 'ready to run').

In addition, when the transactional message passing system 540 receives requests from transactional processes such as a user process relating to transaction processing applications 572, 574, 576 or a process relating to one of the resource managers 595 (in this context there is no difference between a resource manager process and a standard process), it notifies the concurrency control manager 550 of these messages. The concurrency control manager then communicates with the scheduler to update the process table 565 based on the content of such messages. The scheduler 560 examines the process table, and schedules the workload for the transactional system.

This architecture is consistent with that of a standard reduced kernel based system. The difference exhibited by the transactional microkernel is the support in the message passing layer and the concurrency control manager for transactional semantics and the concurrency control manager's support for state safe queues.

Incoming work packets come into the transactional microkernel as messages which are received by the transactional message passing system 540. This transactional message passing system differs from normal message passing systems in that it is able to recognise and support transactional semantics contained within the messages that it receives. If a message is identified as being a transactional message, the transactional message passing system 540 notifies the CCM 550 of that message. If the message relates to a new transactional process, then the CCM allocates a transactional id (Tid) to that new transactional process. If other transactional microkernels are being used in addition to this transactional microkernel, then transactional messages from those other transactional microkernels are multiplexed into the transactional stream being passed from the message passing system 540 to the CCM 550, and these transactions are then passed onto the CCM 550.

The concurrency control manager 550 has a transactional table 570 associated with it, which is an additional table to the process table 565. When the CCM is notified of a transactional message, it adds information of the transaction represented by this message to its transactional table. Additionally it allocates a process (to perform the transaction) to the transaction and a resource manager. An entry for this transactional process is then made in the process table 565 by the scheduler, its status being set to 'ready to run'. An additional column is added to the standard process table to represent transaction Ids, so that reference can be made to the associated entry for that transactional ID in the transactional table 570.

After any of the standard execution interruption points (hardware interrupt, software interrupt, timer tick or message send/receive) the scheduler 560 re-evaluates the entries in the process table and instantiates the next process waiting to be executed.

Based on the above discussion, it is apparent that there are several key changes that need to be made to a standard reduced kernel operating system to produce a transactional microkernel, namely:

1) the Concurrency Control Manager function has to be added to those functions established in the supervisor space 510 of the reduced kernel.

2) The standard Message Passing system has to be adapted to recognise messages having transactional semantics, and to inform the CCM of such messages.

3) An additional column needs to be added to the standard process table to allow a transaction ID to be entered for an entry in the process table that corresponds to a transactional process. This column is completed by the scheduler when the CCM establishes a process for the transaction and an entry for that process is made in the process table.

4) A transactional table is added for use by the CCM to store information about the status of each transaction. Each entry in the transactional table is identified by its transaction ID.

These changes having been made, the scheduler 560 can operate in the normal manner to select processes from the process table for execution by the processor. When resource manager processes lock data records because a particular transactional process has accessed that data record, then any other transactional process that subsequently seeks access to that data will not receive a reply message from the resource manager (containing the data record requested) until the data record has been released ('unlocked') by the process previously having access to that record. Since the CCM 550 is notified by the message passing system 540 of any transactional messages, it can cause the scheduler 560 to update an entry for a particular process to indicate that that process is 'not ready to run' once the process has sent a message via the message passing system to a resource manager requesting access to a data record. The CCM will then instruct the scheduler to reinstate a 'ready to run' status for that process when it is notified by the message passing system that the resource manager has sent the data record to that process. In this manner, transactional processes will not be allocated processor time by the scheduler 560 during the interval between requesting data records from a resource manager and actually receiving those data records. This helps to maintain efficient use of the processor.

One further function performed by the CCM 550 is as follows. To ensure the ACID properties of transaction processing are maintained, it allocates a resource manager to periodically store a copy of the process table 565 and the transactional table 570, since otherwise the information in these tables would be lost if a system failure occurred. The frequency with which these tables are stored by the resource manager is somewhat a matter of choice, but may for instance occur at every sync point. By duplicating this information in a storage device managed by a resource manager, the information can always be retrieved in the event of a system failure so that any committed transactions can be completed.

It is apparent from the above description that the data structures of the transactional microkernel are different from those of a standard microkernel in a number of ways. Firstly the transactional microkernel contains a transactional table 570 having data structures for transactions, resource managers and sessions in addition to the standard process table. Secondly, these data structures are state safe, since they are linked by the concurrency control manager to a resource manager which ensures the ACID properties of the data within the concurrency control manager. This ensures that the complete transactional system is restartable without loss of either data or, given that the process state is held in the resource manager, processes.

As mentioned earlier, the Transactional message passing system can accept transactional work packets from a user process or the resource managers (in this context there is no difference between a resource manager and a standard process). In addition the transactional message passing system can accept transactions from other transactional message passing systems on other processors. This provides intra transactional parallel support for distributed systems at the lowest level within the transactional system.

From the above description of the preferred embodiment, it can be seen that this novel transactional architecture employing a transactional microkernel (T$\mu$K) provides highly efficient support of transactional semantics and the transactional concept of state, whilst ensuring support for the full range of ACID properties at any point within the transactional system. The T$\mu$K architecture also provides system checkpointing at the operating system level allowing highly failure-resistant design. Intra transaction parallelism is supported by inter T$\mu$K transactional message passing providing support for distributed memory, closely coupled parallel processors, and intra transaction parallelism within a single shared memory system is supported by the T$\mu$K's support for multiple concurrent transactions within the concurrency control manager. The T$\mu$K architecture also provides a modular and portable system which is secure and thread safe.

We claim:

1. A transaction processing system for executing transactional processes representing transactions, the system comprising:

a processor for executing the processes;

a main memory accessible to the processor for storing programs, including a reduced kernel operating system, to be executed by the processor, said main memory having a supervisor area (510) where operating system functions forming the reduced kernel are stored, and a user area (520) where user programs and other operating system functions are stored, a data structure (565, 570) being stored in the supervisor area (510) of main memory for storing information about the processes to be executed by the processor, and the following operating system functions being stored in the supervisor area (510) of main memory:

a scheduler (560) for applying a scheduling policy to determine the order in which processes identified in the data structure are provided to the processor for execution;

a concurrency control manager (550) for managing the transactional processes to be executed by the system; and a message passing system (540) for passing messages between processes being executed by the processor, and for notifying the concurrency control manager (550) of any messages received by the message passing system from the transactional processes.

2. A system as claimed in claim 1, wherein a resource manager function (595) is stored in the user space (520) of the main memory for managing data records to be manipulated by the transactional processes.

3. A system as claimed in claim 1, wherein the data structure consists of two tables, the first table (565) being a process table holding information about all processes currently active in the system, there being one entry in the table for each currently active process, and the process table (565) including a field in which a transaction identifier can be stored in any entry for a transactional process, the second table (570) being a transactional table having an entry for each transaction identifier to store information about the status of the transaction.

4. A system as claimed in claim 3, wherein the concurrency control manager (550) allocates a transaction identifier to each new transaction when it is notified by the message passing system (540) of a message requesting a new transactional process to be created.

5. A system as claimed in claim 1, wherein the Concurrency Control Manager (550) periodically instructs a resource manager process to store a copy of the data structure (565, 570) in a storage device associated with that resource manager process, thereby enabling data integrity to be maintained in the transaction processing system.

6. A system as claimed in claim 2, wherein the Concurrency Control Manager (550) is responsive to messages sent between transactional processes and resource manager processes to instruct the scheduler (560) to update the entries for those transactional processes in the data structure to indicate whether those transactional processes are ready to run or not.

7. A method of implementing a transaction processing system to execute transactional processes representing transactions, the system having a processor for executing the processes, and a main memory accessible to the processor for storing programs, including a reduced kernel operating system, to be executed by the processor, the method comprising the steps of:

establishing within said main memory a supervisor area (510) where operating system functions forming the reduced kernel are stored, and a user area (520) where user programs and other operating system functions are stored;

storing a data structure (565, 570) in the supervisor area (510) of main memory for storing information about the processes to be executed by the processor;

storing the following operating system functions in the supervisor area (510) of main memory:
 a scheduler (560) for applying a scheduling policy to determine the order in which processes identified in the data structure are provided to the processor for execution;
 a concurrency control manager (550) for managing the transactional processes to be executed by the system; and
 a message passing system (540) for passing messages between processes being executed by the processor, and for notifying the concurrency control manager (550) of any messages received by the message passing system from the transactional processes.

8. A method as claimed in claim 7, further comprising the step of storing a resource manager function (595) in the user space (520) of the main memory to manage data records to be manipulated by the transactional processes.

9. A method as claimed in claim 7, further comprising the step of storing the data structure as two separate tables, the first table (565) being a process table holding information about all processes currently active in the system, there being one entry in the table for each currently active process, and the process table (565) including a field in which a transaction identifier can be stored in any entry for a transactional process, the second table (570) being a transactional table having an entry for each transaction identifier to store information about the status of the transaction.

10. A method as claimed in claim 9, further comprising the step of employing the concurrency control manager (550) to allocate a transaction identifier to each new transaction when it is notified by the message passing system (540) of a message requesting a new transactional process to be created.

11. A method as claimed in claim 7, further comprising the step of periodically instructing a resource manager process to store a copy of the data structure (565, 570) in a storage device associated with that resource manager process, thereby enabling data integrity to be maintained in the transaction processing system.

12. A method as claimed in claim 8, further comprising the step of instructing the scheduler (560), in response to messages sent between transactional processes and resource manager processes, to update the entries for those transactional processes in the data structure to indicate whether those transactional processes are ready to run or not.

13. A program product incorporating a reduced kernel operating system for use with a transaction processing system to execute transactional processes representing transactions, the transaction processing system having a processor for executing the processes, and a main memory accessible to the processor for storing programs, including the reduced kernel operating system, to be executed by the processor, said main memory having a supervisor area (510) where operating system functions forming the reduced kernel are stored, and a user area (520) where user programs and other operating system functions are stored, the program product being arranged to provide a data structure (565, 570) for storing information about the processes to be executed by the processor, and the following operating system functions, for storage in the supervisor area (510) of main memory when loaded on to the transaction processing system:
 a scheduler (560) for applying a scheduling policy to determine the order in which processes identified in the data structure are provided to the processor for execution;
 a concurrency control manager (550) for managing the transactional processes to be executed by the system; and
 a message passing system (540) for passing messages between processes being executed by the processor, and for notifying the concurrency control manager (550) of any such messages received by the message passing system from the transactional processes.

* * * * *